United States Patent
Park et al.

(10) Patent No.: US 8,331,506 B2
(45) Date of Patent: Dec. 11, 2012

(54) FREQUENCY-DEPENDENT IQ IMBALANCE ESTIMATION

(75) Inventors: Chester Park, Santa Clara, CA (US); Leif Wilhelmsson, Dalby (SE); Lars Sundström, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 435 days.

(21) Appl. No.: 12/722,666

(22) Filed: Mar. 12, 2010

(65) Prior Publication Data

US 2011/0222638 A1 Sep. 15, 2011

(51) Int. Cl.
*H03D 1/04* (2006.01)
(52) U.S. Cl. ........ 375/346; 375/316; 375/259; 375/260; 375/261; 455/296; 455/63.1
(58) Field of Classification Search ............ 375/346, 375/316, 259, 260, 261; 455/296, 63.1
See application file for complete search history.

(56) References Cited

U.S. PATENT DOCUMENTS

| | | | |
|---|---|---|---|
| 7,443,783 B2* | 10/2008 | DeChamps et al. | 370/208 |
| 2005/0152463 A1* | 7/2005 | DeChamps et al. | 375/260 |
| 2007/0097271 A1* | 5/2007 | Gao et al. | 348/724 |
| 2007/0099570 A1* | 5/2007 | Gao et al. | 455/63.1 |
| 2008/0165874 A1* | 7/2008 | Steele et al. | 375/261 |
| 2010/0172309 A1* | 7/2010 | Forenza et al. | 370/329 |
| 2010/0272208 A1* | 10/2010 | Feigin et al. | 375/268 |
| 2011/0135036 A1* | 6/2011 | Andgart et al. | 375/316 |
| 2011/0211549 A1* | 9/2011 | Au et al. | 370/329 |

* cited by examiner

*Primary Examiner* — Kenneth Lam

(57) ABSTRACT

RF impairment parameters, including frequency-dependent IQ imbalance, are estimated in a wideband received signal on a per-sub-band (or per sub-band pair) basis. In one embodiment, block-type pilot signals are received, such as on SCH, and IQ imbalance and carrier frequency offset are estimated from the block-type pilot signals. The block-type pilot signals may be received in only one sub-band. Data and comb-type pilot signals are then received on all sub-bands. Phase noise and channel coefficients are estimated for the first sub-band, based on the IQ imbalance and carrier frequency offset estimates. IQ imbalance is then successively estimated, on a per-sub-band (or per sub-band pair) basis, based on the comb-type pilot signals, the previously estimated carrier frequency offset estimate, and the phase noise and IQ imbalance estimates from prior sub-bands (or pairs). This may comprise iterative estimation based on decision feedback.

23 Claims, 5 Drawing Sheets

FREQUENCY-DEPENDENT IQ IMBALANCE ESTIMATION

FIELD OF THE INVENTION

The present invention relates generally to wireless communication system receivers, and in particular to a system and method for estimation of the frequency-dependent IQ imbalance in a received wireless communication signal.

BACKGROUND

Modern wireless communication systems transmit digital data (including digitized voice signals) across an air interface by modulating the data onto a radio frequency (RF) carrier. The RF signal is received and processed by a receiver, to recover the data. The received signal includes, in addition to the data, impairments such as interference and noise that must be quantified (or estimated) and removed. These impairments arise both from transmission across the air interface (e.g., multipath interference, interference from other signals, noise from the channel) and in the RF and analog receiver circuits that process the received signal. The RF and analog circuit impairment of interest (referred to as RF impairment hereafter) includes phase noise, carrier frequency offset, and particularly IQ imbalance.

To assist receivers in assessing channel conditions, to remove channel-induced interference, it is known to transmit known reference signals, also known as pilots. In Orthogonal Frequency Division Multiplex (OFDM) systems, two types of pilot structures are defined, as depicted in FIG. 1. A so-called block-type pilot arrangement comprises pilot tones inserted into every sub-carrier of an OFDM symbol within a specific period. Block-type pilots are thus frequency-continuous and time-spaced. Block type pilots are useful under a slow fading channel, and estimation of the channel can be based on, e.g., least squares (LS) or minimum mean squared error (MMSE) algorithms.

A so-called comb-type pilot signal comprises pilot tones uniformly inserted into certain sub-carriers of each OFDM symbol, the sub-carriers spaced apart from each other (in time and frequency). The comb-type pilot arrangement was introduced to satisfy the need for equalizing the significant changes even in one OFDM block. Interpolation (in both time and frequency) is required to estimate the channel conditions of data sub-carriers.

IQ imbalance is a gain and/or phase difference in the in-phase (I) and quadrature (Q) phase components of a received signal. IQ imbalance is frequency dependent, especially for wide bandwidth channels. Frequency-dependent IQ imbalance primarily originates from analog channel select filters in zero-IF receivers. The transfer function of such a filter is defined by a number of poles and zeros. The sensitivity to component value mismatch is most prominent for those poles and zeros with high Q-value.

RF impairment estimation and compensation have been investigated for WLAN, in particular, IEEE 802.11a. These solutions are often limited, as they depend on the characteristics of the wireless protocol. For example, the multipath fading channel of WLAN is assumed to be quite static within a frame; this assumption does not hold for many other systems. Additionally, a block-type pilot signal called a preamble is transmitted for the purpose of RF impairment estimation. If the multipath fading remains constant within a frame, it is possible to utilize previously estimated channel coefficients, thereby easing RF impairment estimation. Also, if the block-type pilot signal is available during data transmission, it is easier to meet the required estimation accuracy without relying on decision feedback estimation. Finally, most of the prior art only deals with frequency-independent IQ imbalance, and focuses on only a subset of impairment parameters, for example, IQ imbalance, carrier frequency offset and channel coefficients (excluding phase noise).

Frequency-dependent IQ imbalance estimation using digital baseband FIR filter is proposed in a paper by G. Xing, M. Shen and H. Liu, titled "Frequency offset and I/Q imbalance compensation for direct-conversion receivers," published in the IEEE Trans. on Wireless Commun., vol. 4, vol. 673-680, March 2005, the disclosure of which is incorporated herein by reference in its entirety. However, this solution is targeted for WLAN, and has a limited applicability to other systems—such as LTE, LTE-Advanced, and the like—where the channel varies rapidly with time, and RF impairment estimation relies on comb-type pilot signals during data transmission. More importantly, the proposed solution by Xing, et al. doesn't take into account phase noise. If phase noise is considered together with frequency-dependent IQ imbalance, the resulting signal model is considerably more complex than that presented by Xing, et al.

SUMMARY

According to one or more embodiments disclosed and claimed herein, RF impairment parameters, including frequency-dependent IQ imbalance, are estimated on a per-sub-band (or per sub-band pair) basis. In one embodiment, block-type pilot signals are received, such as on a synchronization channel (SCH), and IQ imbalance and carrier frequency offset are estimated from the block-type pilot signals. The block-type pilot signals may be received in only one, or a few, sub-bands covering the bandwidth of SCH, depending on the size of the sub-bands. Data and comb-type pilot signals are then received on all sub-bands. Phase noise and channel coefficients are estimated for the first sub-band, based on the IQ imbalance and carrier frequency offset estimates. IQ imbalance is then successively estimated, on a per-sub-band (or per sub-band pair) basis, based on the comb-type pilot signals, the previously estimated carrier frequency offset estimate, and the phase noise and IQ imbalance estimates from prior sub-bands (or pairs). This may comprise iterative estimation based on decision feedback. In one embodiment the RF impairment estimates begin with a first sub-band at the center frequency of the received signal bandwidth, and proceed successively outwardly to higher/lower frequencies on a per-sub-band (or per sub-band pair) basis.

One embodiment relates to a method, by a receiver in a wireless communication network, of estimating IQ imbalance in a received wireless communication signal having a predetermined bandwidth. The received signal is frequency divided into a plurality of sub-bands. IQ imbalance and carrier frequency offset are estimated in a first sub-band of the received signal. Phase noise and channel coefficients are estimated in the first sub-band of the received signal. IQ imbalance is iteratively estimated in successive sub-bands of the received signal based on the carrier frequency offset estimate and the phase noise and IQ imbalance estimates from prior sub-bands.

Another embodiment relates to a receiver operative in a wireless communication network. The receiver includes one or more antennas and a receiver operative to receive a wireless communication signal from an antenna. The receiver further includes a controller operative to control the receiver and further operative to frequency divide the received signal into a plurality of sub-bands; estimate IQ imbalance and carrier frequency offset in a first sub-band of the received signal; estimate the phase noise and channel coefficients in the first sub-band of the received signal; and iteratively estimate IQ imbalance in successive sub-bands of the received signal based on the carrier frequency offset estimate and the phase noise and IQ imbalance estimates from prior sub-bands.

DETAILED DESCRIPTION

According to embodiments of the present invention, frequency-dependent IQ imbalance is estimated by dividing a received signal, having a predetermined bandwidth, into a plurality of sub-bands, and estimating the IQ imbalance in each sub-band. These per-sub-band IQ imbalance estimation operations utilize previously-estimated IQ imbalance, and other RF impairment parameters such as carrier frequency offset and phase noise.

Figure 1:
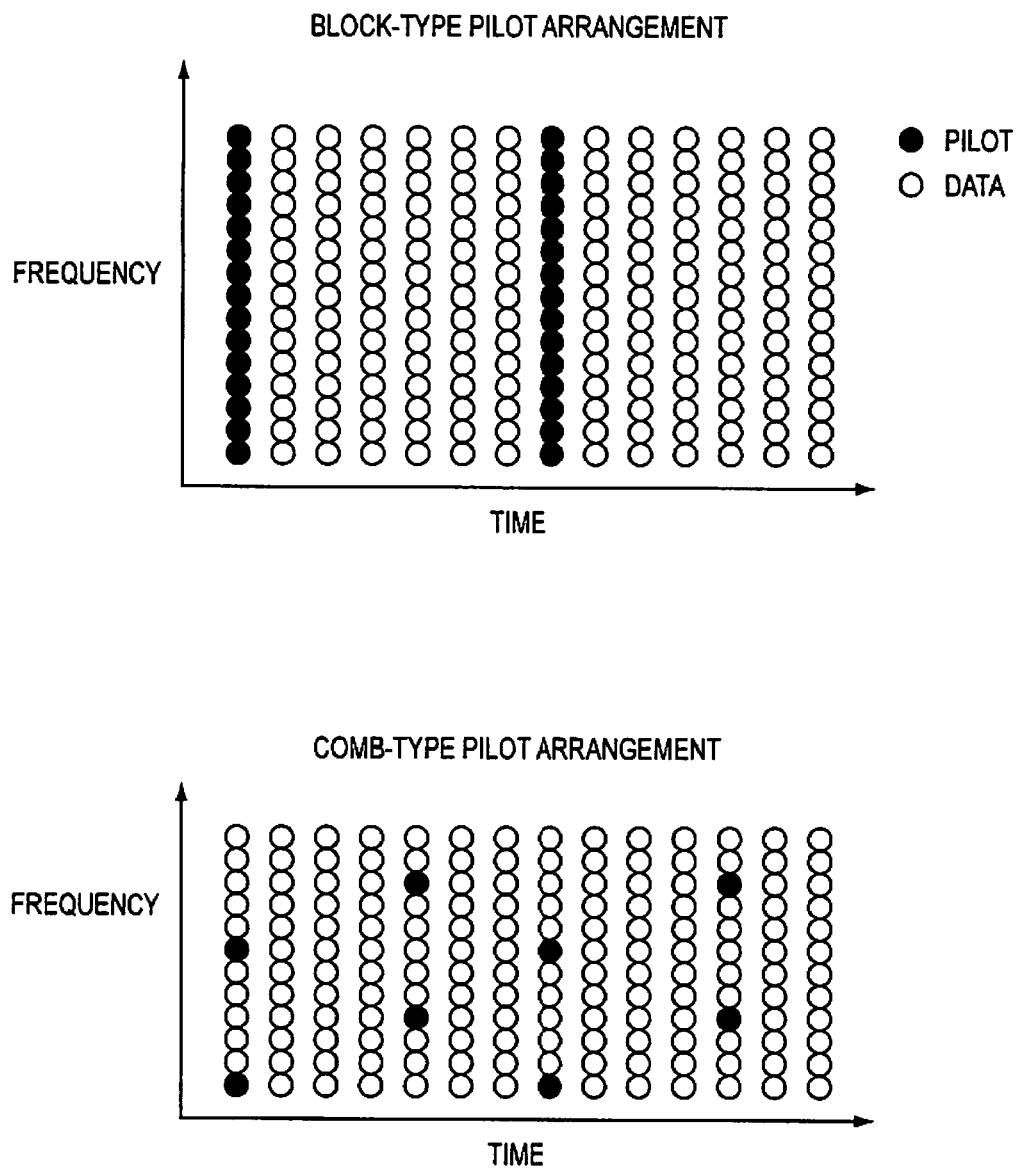
FIG. 1 depicts prior art graphs of block-type and comb-type pilot arrangements in OFDM.
Figure 2:
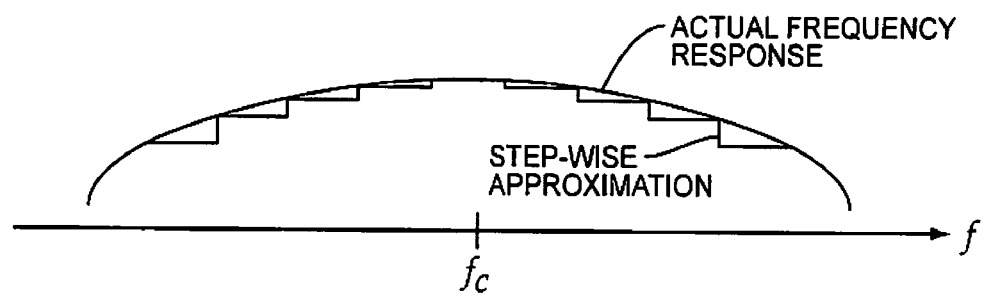
FIG. 2 is a representative frequency graph depicting the actual frequency response of a received signal and a step-wise approximation to the actual frequency response.
Figure 3:
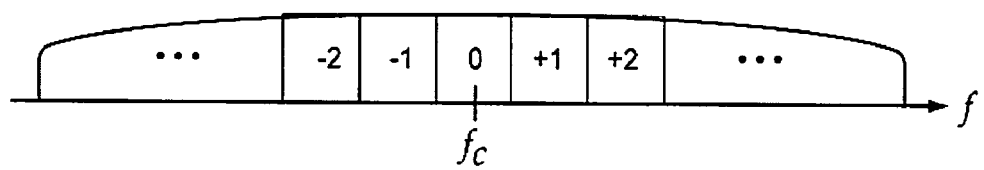
FIG. 3 is a representative frequency graph depicting the division of a wideband signal into a plurality of sub-bands, denoted in pairs outwardly adjacent to a first, centered sub-band.

FIG. 2 depicts a representative received wideband signal, and a step-wise approximation to the actual frequency response of the received signal. As depicted in FIG. 3, the step-wise approximation gives rise to the division of the received signal into a plurality of sub-bands. A first sub-band, numbered 0, is located at (e.g., centered on) the center frequency $f_c$ of the received signal bandwidth. A pair of second sub-bands, numbered +/−1, are located adjacent to and flanking the first sub-band 0. Successive pairs of sub-bands, such as those numbered +/−2 in FIG. 3, are each frequency-adjacent to a prior pair of sub-bands, extending outwardly (in frequency) to cover the full received signal bandwidth. Each sub-band may comprise one or more resource blocks, and hence spans a number of sub-carrier frequencies.

To provide a full, complete, and enabling disclosure, embodiments of frequency-dependent IQ imbalance estimation are described herein in the context of the downlink of Long Term Evolution (LTE, or LTE Advanced) enhancements to the Universal Mobile Telecommunications System (UMTS). However, the present invention is not limited to this context, and may be advantageously applied to any wireless communication system in which IQ imbalance is frequency dependent.

As discussed above, the LTE downlink employs two different kinds of reference signals, also called pilots. A frequency-continuous, time-spaced (block-type) pilot allocation is transmitted on a primary (P-SCH) or secondary (S-SCH) synchronization channel (SCH). A time- and frequency-spaced (comb-type) pilot reference sequence (RS) is transmitted with system data. See 3GPP TS 36.211. Since one purpose of SCH is to assist the estimation of channel coefficients and carrier frequency offset, IQ imbalance may be estimated together with the block-type pilots, or iteratively based on decision feedback. Carrier frequency offset and IQ imbalance typically vary with time so slowly that they remain almost constant across a few frames. See, for example, the paper by Q. Zou, A. Tarighat and A. H. Sayed, titled, "Joint compensation of IQ imbalance and phase noise in OFDM wireless systems," published in the IEEE Trans. On Communications, vol. 57, pp. 404-414, February 2009 (hereinafter, "Zou-I"), the disclosure of which is incorporated herein by reference in its entirety. Since the estimation using SCH always precedes the actual data reception, the estimates obtained from SCH, e.g., carrier frequency offset and IQ imbalance (of the first sub-band), may be utilized when RF impairment parameters are estimated during the subsequent data reception. This is desirable for the additional reason that the block-type pilot is more favorable in terms of estimation of RF impairment parameters (in slow fading channel) than comb-type pilots, since there is no ambiguity of data subcarriers and no need to rely on decision feedback estimation.

However, since IQ imbalance is not necessarily frequency-independent, particularly for wideband channels, see Xing, et al., and SCH is only transmitted over the center six resource blocks (RB) (see FIG. 3), IQ imbalance must be estimated during the actual data transmission as well (at least, outside of the center six RBs). Comb-type pilots, RS, assist in estimating RF impairment parameters during data transmission.

In the presence of frequency-dependent IQ imbalance and phase noise, the signal model is not mathematically tractable, as opposed to Xing, et al. In detail, the received signal r(t) is expressed as $$r(t) = \frac{1}{4}(h_i(t) + e^{-j\phi}h_q(t)) * \left(\sum_k s_k c(t-kT)e^{-j\theta(t)}\right) + \frac{1}{4}(h_i(t) - e^{j\phi}h_q(t)) * \left(\sum_k s_k^* c^*(t-kT)e^{j\theta(t)}\right) \quad (1)$$

where $h_i(t)$ and $h_q(t)$ represent the in-phase (I) and quadrature-phase (Q) filters (including gain imbalance), respectively, $\phi$ represents the phase imbalance, $s_k$ represents the transmitted OFDM symbol at the k-th sample given as $$s_k = \sum_{n=0}^{N-1} S_n e^{j\frac{2\pi nk}{N}}$$

($S_n$ is the modulation symbol at the n-th subcarrier), c(t) represents the multipath fading channel, and $\theta(t)$ represents the phase noise (including carrier frequency offset).

The exponential of phase noise, $e^{\theta(t)}$ or $e^{-\theta(t)}$, the so-called carrier noise, is considered as measure of phase noise, since phase noise always affects the received signal through the exponential term. Note that $h_i(t)$ and $h_q(t)$ cover the analog filters, baseband amplifiers, analog-to-digital converters (ADC) and decimation chain of in-phase (I) and quadrature-phase (Q) branches, respectively.

In order to simplify the analysis, the in-phase and quadrature-phase filters are assumed to be frequency-flat within a set of contiguous RBs, which justifies the step-wise approximation of frequency response (see FIG. 2). Therefore, it is possible to assume that frequency-dependent IQ imbalance is also frequency-flat within a set of contiguous RBs (referred to as a sub-band hereafter; see FIG. 3). This step-wise approximation is reasonable, given that frequency-dependent IQ imbalance is typically caused by analog channel selection filters.

Figure 4:
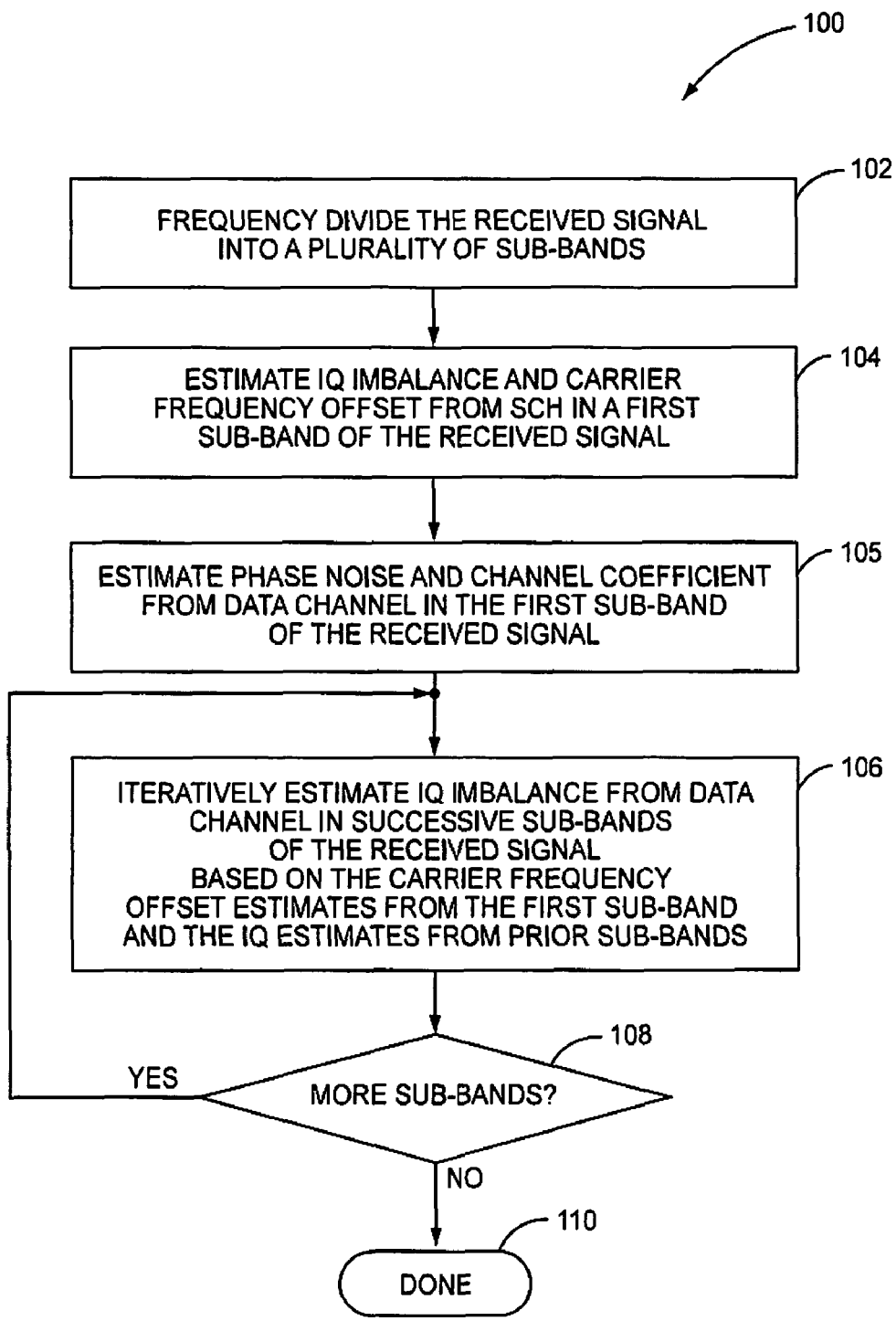
FIG. 4 is a flow diagram of a method of estimating IQ imbalance in a broadband signal.

FIG. 4 depicts a method 100 of estimating IQ imbalance in a received wireless communication signal having a predetermined bandwidth. The entire system bandwidth of the received signal is divided into multiple sub-bands, which are numbered from the center sub-band to the edge sub-band (FIG. 4, block 102). For example, sub-band-0 is the center sub-band, sub-band-m is the m-th higher sub-band, sub-band-(−m) is the m-th lower sub-band and so forth. Therefore, sub-band-m is a mirror image of sub-band-(−m). See FIG. 3.

Since IQ imbalance is assumed to be frequency-independent within a sub-band, the received signal within Sub-band-m, $r_m(t)$, is expressed as $$r_m(t) = \frac{1}{4}(h_{i,m} + e^{-j\phi}h_{q,m}) * \left(\sum_k u_{k,m} c(t-kT) e^{-j\theta(t)}\right) + \frac{1}{4}(h_{i,m} - e^{j\phi}h_{q,m}) * \left(\sum_k u^*_{k,-m} c^*(t-kT) e^{j\theta(t)}\right) \quad (2)$$

where $h_{i,m}$ and $h_{q,m}$ represent the in-phase gain and quadrature-phase gain of sub-band-m, respectively. Here $u_{k,m}$ denotes the transmitted OFDM symbol at the k-th sample of sub-band-m and is given as $$u_{k,m} = \sum_{n=0}^{N-1} U_{n,m} e^{j\frac{2\pi nk}{N}}$$

where $U_{n,m} = S_n$, if the n-th sub-carrier lies within sub-band-m, and $U_{n,m} = 0$, if the n-th sub-carrier falls outside of sub-band-m. Note that $r_m(t)$ contains both the signal from sub-band-m and the signal from sub-band-(−m), as shown in Equation (2). Likewise, the received signal within sub-band-(−m), $r_{-m}(t)$, is expressed as $$r_{-m}(t) = \frac{1}{4}(h_{i,-m} + e^{-j\phi}h_{q,-m}) * \left(\sum_k u_{k,-m} c(t-kT) e^{-j\theta(t)}\right) + \frac{1}{4}(h_{i,-m} - e^{j\phi}h_{q,-m}) * \left(\sum_k u^*_{k,m} c^*(t-kT) e^{j\theta(t)}\right) \quad (3)$$

Note that $r_{-m}(t)$ contains both the signal from sub-band-m and the signal from sub-band-(−m).

According to embodiments of the present invention, two estimation steps are performed. The first step is to estimate RF impairment parameters of sub-band-0 (FIG. 4, blocks 104, 105). The second step is to estimate RF impairment parameters of the remaining sub-bands, on a per-sub-band (or per sub-band pair) basis (blocks 106-108).

Figure 5:
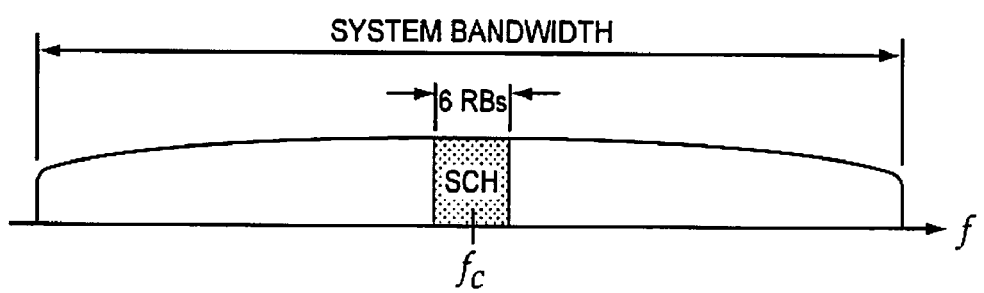
FIG. 5 is a representative frequency graph depicting the reception of block-type pilot signals in a synchronization channel over six resource blocks.

The first estimation step begins by receiving bock-type pilot signals on SCH. These are transmitted in six RBs as depicted in FIG. 5. In some embodiments, the SCH bandwidth corresponds to sub-band 0 (in other embodiments, it is different, depending on how sub-bands are defined). From these pilot signals, IQ imbalance and carrier frequency offset are estimated (FIG. 4, block 104).

Data are then received in all sub-bands. The phase noise and channel coefficients are estimated from the data and comb-type pilots in sub-band-0, using the IQ imbalance and carrier frequency offset already estimated from SCH. These reduce the ambiguity of the received signal within sub-band-0 and thus improve the estimation accuracy (thanks to the block-type property of SCH, the estimate of IQ imbalance and carrier frequency offset tends to be more accurate).

Since the IQ imbalance of sub-band-0 and carrier frequency offset are known to the receiver, it is easy to compensate for the distortion from the received signal. See, for example, papers by G. Fettweis, M. Lohning, D. Petrovic, M. Windisch, P. Zillmann and W. Rave, titled, "Dirty RF: a new paradigm," published in the IEEE PIMRC2005, vol. 4, pp. 2347-2355, September 2005, the disclosure of which is incorporated herein by reference in its entirety, and Zou-I. Once IQ imbalance and carrier frequency offset are completely removed, the remaining RF impairment, phase noise and channel coefficients, are relatively easy to estimate. See, e.g., Zou-I. However, note that the estimation must be based on the observation within sub-band-0, i.e., $r_o(t)$ and the estimation of channel coefficients covers sub-band-0 only.

Figure 6:
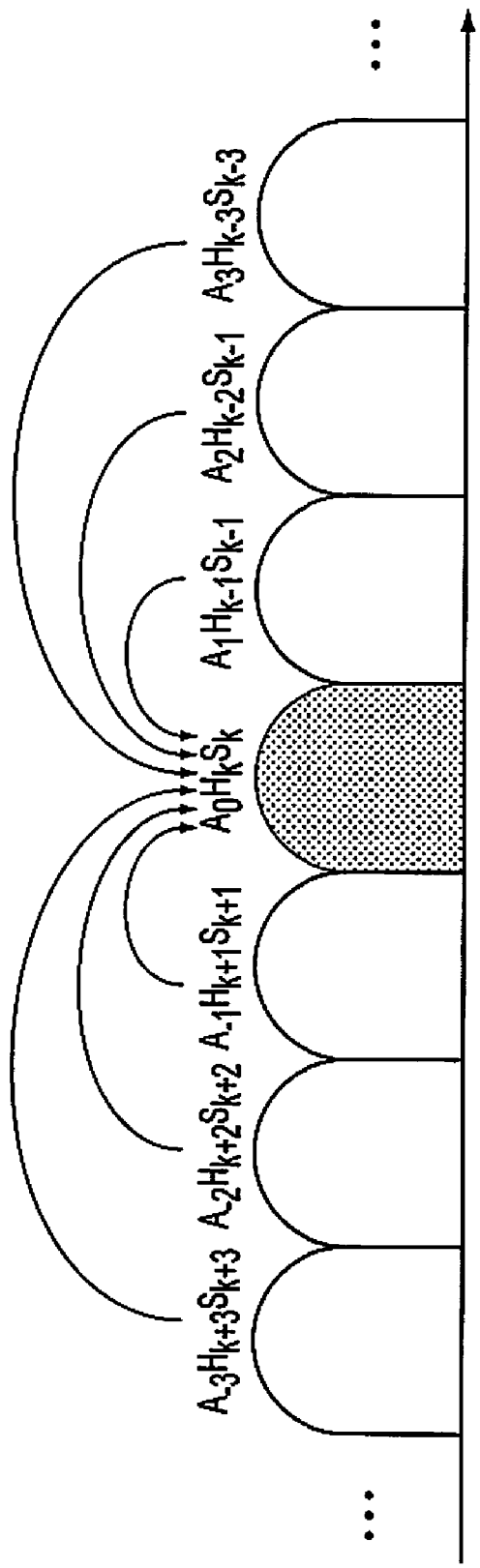
FIG. 6 is a representative frequency graph depicting inter-channel interference in the first sub-band of FIG. 3, due to phase noise from other sub-bands.

As for the estimation of phase noise, the actual phase noise (or, equivalently, the set of all the spectral components) needs to be estimated in principle, taking into account inter-carrier interference (ICI) from the other sub-bands. FIG. 6 illustrates the ICI at the k-th subcarrier, where $A_k$ represents the spectral component of carrier noise at the k-th subcarrier and $H_k$ represents the channel response at the k-th subcarrier. As shown in FIG. 6, since the received signal at a certain subcarrier includes the ICI from its own sub-band as well as all the other sub-bands, it is impossible to estimate the actual phase noise from a sub-band. However, assuming that carrier noise is dominated by low-frequency spectral components, i.e., $A_k = 0$, $|k| > P$, it is possible to estimate the low-frequency spectral components from sub-band-0. Then it is readily understood that the remaining problem is equivalent to the estimation of channel coefficients in frequency-selective channels, as described, e.g., by S. A. Fechtel and H. Meyr, in a paper titled, "Optimal parametric feedforward estimation of frequency-selective fading radio channels," published in the IEEE Trans. on Commun., vol. 42, pp. 1639-1650, February 1994, the disclosure of which is incorporated herein by reference in its entirety.

The estimation of phase noise and channel coefficients has been studied. See, for example, Zou-I, and also papers by J. Tubbax, B. Come, L. V. der Perre, S. Donnay, M. Engels, H. D. Man and M. Moonen, titled, "Compensation of IQ imbalance and phase noise in OFDM systems," published in the IEEE Trans. On Wireless Commun., vol. 4, pp. 872-877, May 2005, the disclosure of which is incorporated herein by reference in its entirety, and by Xing, et al. Since the pilots (RS) are in a comb-type arrangement, it is reasonable to iteratively estimate these quantities using decision feedback in order to improve the estimation accuracy. See, e.g., Zou-I., and another paper by Q. Zou, A. Tarighat and A. H. Sayed, "Compensation of phase noise in OFDM wireless systems", IEEE Trans. on Signal Proc., vol. 55, pp. 5407-5424, November 2007 (hereinafter, "Zou-II"), the disclosure of which is incorporated herein by reference in its entirety.

The only difference from the initial estimation in Zou-II is that embodiments of the present invention must cover both phase noise and channel coefficients with comb-type pilot. An implementation example is to start with ICI free phase noise (common phase error only), estimate and interpolate the channel coefficients (plus common phase error) based on pilot subcarriers (RS), detect the data symbols (based on interpolated channel coefficients) and finally estimate phase noise (and channel coefficients) again using decision feedback. At this point, the initial estimation in Zou-II can be utilized, i.e., phase noise and channel coefficients are iteratively estimated based on the decision feedback. The estimated phase noise is stored and utilized later when the RF impairment parameters of the other sub-bands are to be estimated.

The second estimation step (FIG. 4, blocks 106-108) is to estimate IQ imbalance and channel coefficients in the remaining sub-bands, i.e., sub-band-m (where m is nonzero integer). This estimation utilizes the carrier frequency offset estimate from SCH (block 104) and the phase noise estimate from the first sub-band (block 105). Now the estimation of RF impairment parameters moves to the first higher sub-band, sub-band-1. As illustrated in FIG. 3, sub-band-1 and sub-band-(−1) are mirror images to each other, and they are covered together. The advantage of the outward, per-sub-band pair estimation is that IQ imbalance of the previous sub-band (or sub-band pair) can be reused as the initial input to the iterative estimation. Typical low-pass filters have reduced accuracy as the frequency is increased towards the region of the cut-off frequency of the filter. Also, for filters with large bandwidths (e.g., tens of MHz or more) there is an additional contribution of uncertainty due to parasitic elements of circuit devices (primarily capacitances) that also manifest itself at higher frequencies. Therefore, when performing an iterative IQ-imbalance estimation, it is justified to start from a low frequency (DC) and move outwardly (in frequency) from the initial frequency. This process continues until the IQ imbalance has been estimated in all sub-bands (block 108), after which it terminates (block 110).

The estimation of IQ imbalance and channel coefficients based on block-type pilot has been studied. See, e.g., Zou-I, Tubbax, et al., Xing, et al., and a paper by A. Tarighat, R. Bagheri and A. H. Sayed, titled, "Compensation schemes and performance analysis of IQ imbalances in OFDM receivers," published in the IEEE Trans. On Signal Proc., vol. 53, pp. 3257-3268, August 2005, the disclosure of which is incorporated herein by reference in its entirety. Since RS is comb-type pilot, it is reasonable to iteratively estimate using decision feedback in order to improve the estimation accuracy, as described in Zou-I and Tarighat, et al. Embodiments of the present invention differ from Tarighat, et al. in that the initial estimation must cover both IQ imbalance and channel coefficients with comb-type pilot signals, not block-type pilot signals. Another difference is that the received signal still contains the contribution of phase noise, though this is already estimated from the previous sub-bands (note that it is impossible to compensate for phase noise before IQ imbalance is compensated for). In one embodiment, one starts with IQ imbalance from the previous sub-bands (or starts without IQ imbalance), compensates for phase noise based on phase noise from previous sub-bands, estimates and interpolates the channel coefficients based on pilot subcarriers (RS), detects the data symbols, and finally estimates IQ imbalance (and channel coefficients), again using decision feedback.

The decision feedback estimation of IQ imbalance (and channel coefficients, possibly including phase noise) has been studied. See Zou-I and Tarighat, et al. Note, however, that two different sets of IQ imbalance parameters are involved in frequency-dependent IQ imbalance estimation. If IQ imbalance does not depend on frequency, IQ imbalance estimation involves two parameters: one for the desired signal and one for its image (i.e., the other sub-band forming a pair). By taking sub-bands in pairs, e.g., sub-band-1 and sub-band-(−1), there is a two-sample observation with two parameters to estimate. However, with frequency-dependent IQ imbalance, both parameters have different values for each sub-band, yielding four parameters—both the desired signal and its image for each of sub-band-m and sub-band-(−m) (see equations (2) and (3) above). In order to estimate these four parameters, observations from four sub-bands are required, either from two contiguous pairs of sub-bands (that experience almost equal IQ imbalance and channel coefficients), or from two consecutive OFDM symbols.

As the estimation of RF impairment parameters proceeds to the edge of system bandwidth, it is possible to improve the estimation accuracy of phase noise by adding higher-frequency spectral components (of carrier noise). In one embodiment, all the previously covered sub-bands are aggregated, and the phase noise is estimated again over them.

The per-sub-band (or sub-band pair) approach to estimation of frequency-dependent IQ imbalance (together with phase noise) yields highly accurate RF impairment estimates. Compared to the conventional frequency-independent IQ imbalance estimation (e.g., as described by Fettweis, et al., Zou-I and Zou-II, Tubbax, et al., and Tarighat, et al.), embodiments of the present invention provide significant performance gain, especially for wide-band user bandwidth (e.g., 20 MHz for LTE). Unless the frequency-dependence of IQ imbalance is considered properly, the following demodulation operation experiences an SNR loss of 2 dB for a high SNR regime (20 dB), and up to 15 dB for an extremely-high SNR regime (40 dB), as disclosed by Xing, et al.

Figure 7:
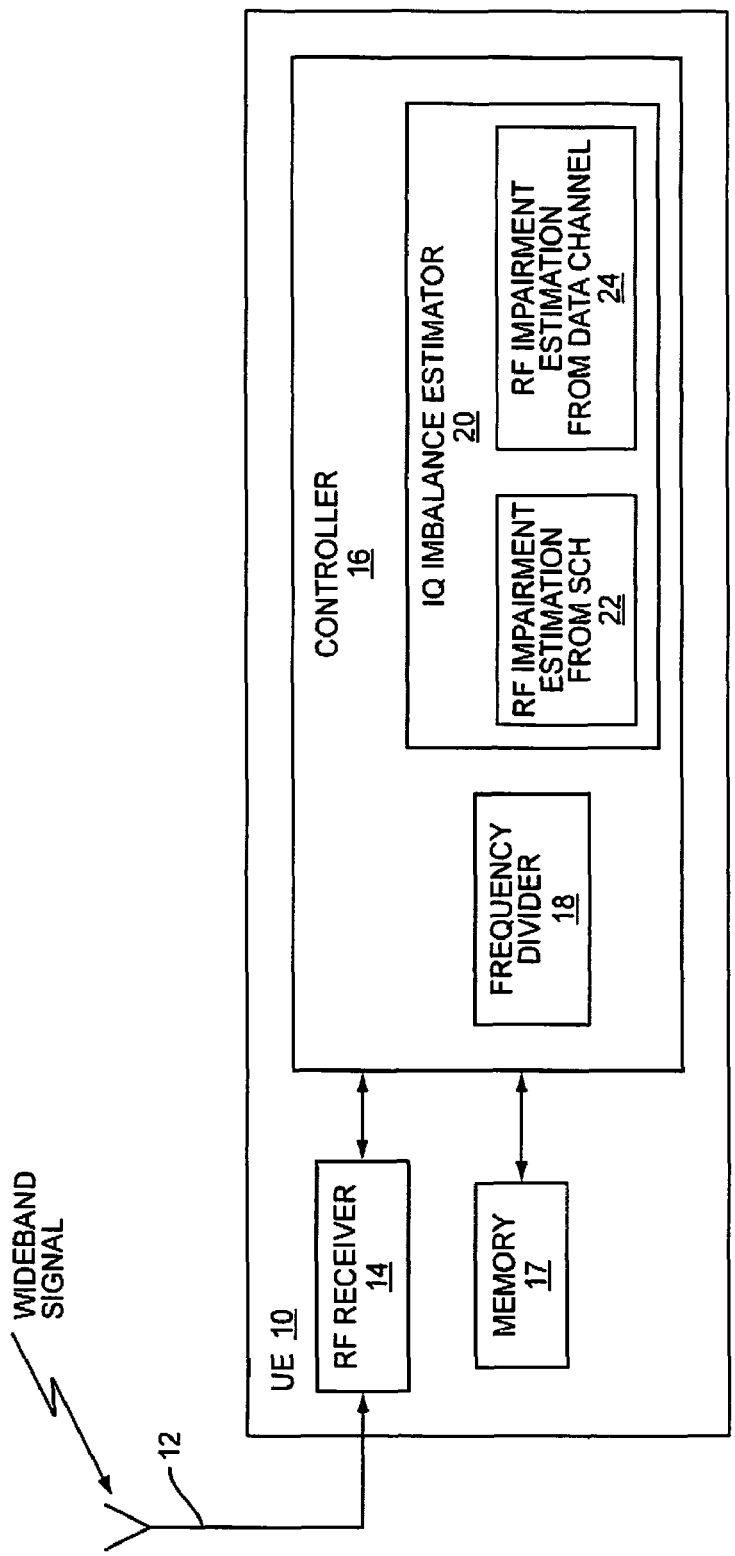
FIG. 7 is a functional block diagram of a UE operative to implement the method of FIG. 4.

FIG. 7 depicts a UE 10 operative to implement the method 100. A wideband signal is received on one or more antennas 12, and processed by an RF receiver 14. A controller 16 includes a frequency divider 18 operative to divide the received wideband signal into a plurality of sub-bands, as depicted in FIG. 3. The controller 16 also includes an IQ imbalance estimator 20. The IQ imbalance estimator 20 includes a unit 22 operative to estimate RF impairments such as IQ imbalance and carrier frequency offset in a first sub-band from SCH. The IQ imbalance estimator 20 also includes a unit 24 operative to estimate, from a data channel including comb-type pilots, RF impairments such as phase noise and channel coefficients, and further operative to successively estimate IQ imbalance in sub-bands (or sub-band pairs) based on the carrier frequency offset and phase noise estimates, and the IQ imbalance estimate from previous sub-bands (or pairs).

Those of skill in the art will appreciate that the controller 16 may comprise a stored-program microprocessor or digital signal processor (DSP) with appropriate control software stored in memory 17. The frequency divider 18 and/or RF impairment estimators 22, 24 may comprise software modules stored in the memory 17 and executed by the controller 16 to provide the required functionality. In general, any one or more of the controller 16, frequency divider 18, or RF impairment estimators 22, 24 may be implemented in dedicated hardware, in programmable logic with appropriate firmware, in software, or in any combination thereof.

Performance is improved over the prior art by estimating RF impairment parameters (such as IQ imbalance and carrier frequency offset) from SCH, and using these estimates to estimate the RF impairment parameters (such as IQ imbalance, phase noise, and channel coefficients) during the subsequent data transmission. LTE presents a more challenging environment in terms of RF impairment estimation than WLAN. For example, the fading channel is time-varying and RS is a comb-type pilot signal (not block-type). Therefore, even iterative RF impairment estimation using prior art techniques might experience severe inaccuracy. Accordingly, the performance can be improved dramatically by simply removing a small fraction of ambiguity. In the case of LTE, ambiguity is reduced for the IQ imbalance and carrier frequency offset estimates for the central six RBs in SCH. For a given required estimation accuracy, the embodiments of the present invention contribute to low-complexity implementation, since it is not required to include IQ imbalance in the iterative estimation, as opposed to the prior art, e.g., Zou-I.

Performance is further improved over the prior art by estimating RF impairment parameters (such as phase noise) from prior sub-bands, and using these estimates to estimate the RF impairment parameters (such as IQ imbalance and channel coefficients) in subsequent sub-bands (or sub-band pairs). Similarly, even iterative estimation might be improved significantly by simply removing a small fraction of ambiguity, in this case, phase noise, or more accurately, its low-frequency spectral components for the non-central RBs. As far as ICI is concerned, the typical phase noise characteristic is such that most of the power is concentrated within a two-sided bandwidth of a few hundred kHz. It would thus be necessary only to consider the number of frequency bins corresponding to carrier noise (or, equivalently, the corresponding number of the FFT indices) for estimation. For LTE this means that only approximately ten to twenty spectral components would be necessary, and therefore the six central RBs suffice for estimation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, by a receiver in a wireless communication network, of estimating IQ imbalance in a received wireless communication signal having a predetermined bandwidth, comprising:
   frequency dividing the received signal into a plurality of sub-bands;
   estimating IQ imbalance and carrier frequency offset in a first sub-band of the received signal;
   estimating a phase noise and channel coefficients in the first sub-band of the received signal; and
   iteratively estimating IQ imbalance in successive sub-bands of the received signal based on the carrier frequency offset estimate and the phase noise and IQ imbalance estimates from prior sub-bands.

2. The method of claim 1 wherein frequency dividing the received signal into a plurality of sub-bands comprises dividing the received signal into a first sub-band located at the center frequency of a signal bandwidth, a pair of second sub-bands adjacent to and flanking the first sub-band, and one or more successive pairs of sub-bands, each frequency-adjacent to a prior pair of sub-bands.

3. The method of claim 2 wherein the estimating IQ imbalance and carrier frequency offset in the first sub-band of the received signal comprises:
   receiving frequency-continuous, time-spaced (block-type) reference signals in the first sub-band; and
   estimating IQ imbalance and carrier frequency offset in the first sub-band based on the block-type reference signals.

4. The method of claim 3 wherein receiving block-type reference signals in the first sub-band comprises receiving block-type reference signals over six resource blocks on a synchronization channel.

5. The method of claim 3 wherein estimating the phase noise and channel coefficients in the first sub-band of the received signal comprises:
   receiving data and time- and frequency-spaced (comb-type) reference signals in all sub-bands; and
   estimating phase noise and channel coefficients in the first sub-band based on the comb-type reference symbols in the first sub-band.

6. The method of claim 5 wherein receiving comb-type reference signals in all sub-bands comprises receiving comb-type reference signals on a data channel.

7. The method of claim 5 wherein estimating IQ imbalance in successive sub-bands of the received signal based on the carrier frequency offset estimate and the phase noise and IQ imbalance estimates from prior sub-bands comprises ignoring IQ imbalance of the prior sub-band, compensating for the phase noise with previously estimated phase noise, and then estimating IQ imbalance and channel coefficients for the current sub-band based on the comb-type reference signals.

8. The method of claim 5 wherein estimating IQ imbalance in successive sub-bands of the received signal based on the carrier frequency offset estimate and the phase noise and IQ imbalance estimates from prior sub-bands comprises compensating for the IQ imbalance with the IQ imbalance of the prior sub-band, compensating for the phase noise with previously estimated phase noise, and then estimating IQ imbalance and channel coefficients for the current sub-band based on the comb-type reference signals.

9. The method of claim 5 wherein estimating phase noise comprises estimating low-frequency spectral components of phase noise, and using the low-frequency spectral components to approximate the actual phase noise.

10. The method of claim 9 wherein estimating phase noise further comprises updating the phase noise estimate by adding high-frequency spectral components as RF impairment parameters of successive sub-bands are estimated.

11. The method of claim 1 wherein estimating IQ imbalance in successive sub-bands of the received signal based on the carrier frequency offset estimate and the phase noise and IQ imbalance estimates from prior sub-bands comprises estimating the IQ imbalance using decision feedback.

12. A receiver operative in a wireless communication network, comprising:
   one or more antennas;
   a receiver operative to receive a wireless communication signal from an antenna; and
   a controller operative to control the receiver and further operative to
   estimate IQ imbalance and carrier frequency offset in a first sub-band of the received signal;
   estimate phase noise and channel coefficients in the first sub-band of the received signal; and
   iteratively estimate IQ imbalance in successive sub-bands of the received signal based on the carrier frequency offset estimate and the phase noise and IQ imbalance estimates from prior sub-bands.

13. The receiver of claim 12 wherein the controller is operative to frequency divide the received signal into a plurality of sub-bands by dividing the received signal into a first sub-band located at the center frequency of a signal bandwidth, a pair of second sub-bands adjacent to and flanking the first sub-band, and one or more successive pairs of sub-bands, each frequency-adjacent to a prior pair of sub-bands.

14. The receiver of claim 13 wherein the controller is operative to estimate the phase noise and the IQ imbalance in a first sub-band of the received signal by controlling the receiver to receive frequency-continuous, time-spaced (block-type) pilot reference signals in the first sub-band;

estimating IQ imbalance and carrier frequency offset in the first sub-band based on the block-type reference signals;

controlling the receiver to receive data and time- and frequency-spaced (comb-type) reference signals in all sub-bands; and estimating phase noise in the first sub-band based on the comb-type reference symbols in the first sub-band.

15. The receiver of claim 14 wherein controlling the receiver to receive block-type pilot reference signals in the first sub-band comprises controlling the receiver to receive block-type pilot reference signals over six resource blocks on a synchronization channel.

16. The receiver of claim 14 wherein the controller is further operative to estimate RF impairment parameters in successive sub-bands of the received signal based on the previously estimated phase noise.

17. The receiver of claim 14 wherein estimating RF impairment parameters in successive sub-bands of the received signal comprises assuming no IQ imbalance, and then estimating and interpolating channel coefficients based on the comb-type pilot signals and previously estimated phase noise.

18. The receiver of claim 14 wherein estimating RF impairment parameters in successive sub-bands of the received signal comprises iteratively estimating the RF impairment parameters using decision feedback.

19. The receiver of claim 14 wherein estimating phase noise comprises estimating low-frequency spectral components of phase noise, and using the low-frequency spectral components to approximate the actual phase noise.

20. The receiver of claim 19 wherein estimating phase noise further comprises updating the phase noise estimate by adding high-frequency spectral components as RF impairment parameters of successive sub-bands are estimated.

21. The receiver of claim 12 wherein the controller is further operative to estimate RF impairment parameters in successive sub-bands of the received signal based on the IQ imbalance estimated in prior sub-bands.

22. The receiver of claim 21 wherein the controller is operative to estimate RF impairment parameters by initially assuming inter-channel interference-free phase noise, and then estimating and interpolating the channel coefficients with common phase error, based on the comb-type pilot signals.

23. The receiver of claim 12 wherein the controller is operative to iteratively estimate RF impairment parameters using decision feedback.

* * * * *

UNITED STATES PATENT AND TRADEMARK OFFICE
CERTIFICATE OF CORRECTION

PATENT NO. : 8,331,506 B2  Page 1 of 1
APPLICATION NO. : 12/722666
DATED : December 11, 2012
INVENTOR(S) : Park et al.

It is certified that error appears in the above-identified patent and that said Letters Patent is hereby corrected as shown below:

In Column 4, Line 60, delete "$h_t(t)$" and insert -- $h_i(t)$ --, therefor.

In Column 5, Line 29, delete "$u_{k,m}$," and insert -- $u_{k,m}$ --, therefor.

Signed and Sealed this
Second Day of April, 2013

Teresa Stanek Rea
*Acting Director of the United States Patent and Trademark Office*